March 6, 1934. M. M. ASSAEL Re. 19,103

DECORATIVE PRODUCT

Original Filed April 17, 1930

M. M. Assael
INVENTOR

By: Mains & Clark
Attys.

Reissued Mar. 6, 1934

Re. 19,103

UNITED STATES PATENT OFFICE 19,103

DECORATIVE PRODUCT

Maurice Moise Assael, Paris, France, assignor to Assael and Arbib, Incorporated, New York, N. Y., a corporation of New York Original No. 1,819,535, dated August 18, 1931, Serial No. 445,152, April 17, 1930. Application for reissue January 25, 1932, Serial No. 588,798. In France March 12, 1930

18 Claims. (Cl. 41—22)

The present invention relates to a new decorative product, which may be used in sheets or slabs, and may be readily manufactured at a small expense, for giving the impression of a surface constellated with diamonds or gems, for use in jewelry, millinery, Paris articles or inlaid fancy articles, trades, etc., hereinafter collectively referred to as jewelry.

According to the invention, my new decorative product is formed by superposition of two sheets or slabs of plastic matter or the like, between which is interposed any suitable substance comprising a very large number of very small bright facets, the top sheet or slab being transparent and painted with a varnish or other coloured transparent material, or decorated, by printing or otherwise, preferably on its inner surface, with designs showing the outlines of diamonds or gems of all colours, dimensions and cuts.

According to another characteristic of this invention, the bright faceted surface is formed with fine particles or reflecting flakes (pounded glass, metallic particles, chemicals, etc.) and is squeezed and set in two slabs of plastic matter which are submitted in course of manufacture to a suitable pressure, preferably with the aid of heat.

According to another method of manufacture, in the particular case where this product is to be prepared directly into a coating to be spread over any suitable article, the scintillating substance consists of a thin metallic sheet (tin or other), suitably creased in order to show a number of facets, said sheet being maintained between the two slabs of plastic matter, and the unit formed by the three sheets being set in any manner, around its edges, over the object to be coated. The creased metallic sheet may be replaced by a metallic varnish, with which the bottom sheet will be coated.

In the accompanying drawing, given solely by way of example.

Figure 1:
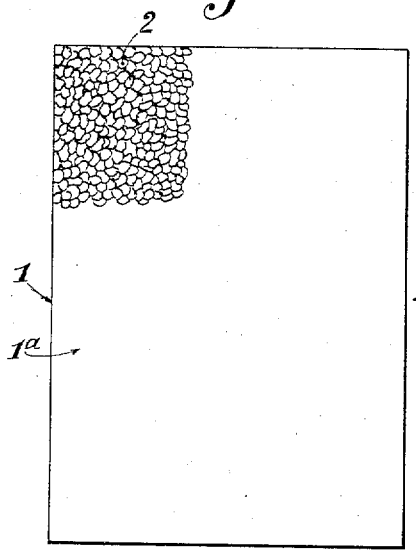
Fig. 1 is a horizontal view of the bottom slab of plastic matter, covered with fine scintillating flakes.
Figure 2:
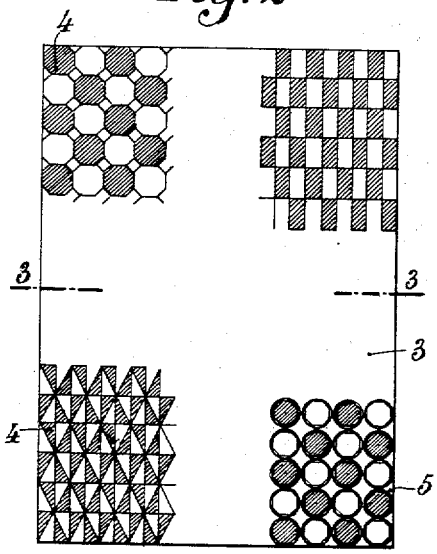
Fig. 2 is a top view of a decorative sheet according to the invention, showing some of the shapes of diamonds or gems of which the transparent sheet gives the impression.
Figure 3:
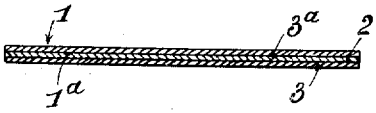
Fig. 3 is a section on line 3—3 of Fig. 2.

According to the construction shown in Figs. 1 to 3, the product in conformity with this invention is shown in the shape of a comparatively rigid slab, independent of all support, and easily handled.

Such slab comprises a bottom sheet 1. This sheet is made of any plastic matter, celluloid, galalithe, etc., (transparent or not) or of non-inflammable plastic matter. The slab is coated, as shown in Fig. 1, over its top, inner face 1*a* with fine particles 2 of any bright faceted material (pounded glass, metallic powder, chemicals, etc.). This material is spread as uniformly as possible over surface 1*a* by any means, mechanical or not. Material 2 is covered with a second sheet 3 also made of plastic matter. Sheet 3 is transparent and is provided over one of its faces, preferably its inner face 3*a* with suitable designs 4. Such designs, previously obtained by any means (by hand or mechanically) and with the use of a varnish or other suitable transparent material, show in colour the outlines of gems of all dimensions, colours and cuts (gauged stones, cabochons, rounds, ovals, etc.), the gaps between coloured parts showing the usual shapes of diamonds.

Fig. 2 shows in top view several possible aspects of sheet 3. For instance, octagons can be seen on the top left hand corner, rectangles in the right corner, triangles in the left bottom corner, which form rhombus by their juxtaposition. In this figure, the shaded polygons correspond for instance to coloured stones, while the blank polygons correspond to diamonds.

Both sheets 1 and 3 are submitted in course of the preparation of the product, to a certain pressure, preferably with the aid of heat, so as to set powdered material 2 in the sheets. The product thus obtained is a unitary slab. The outer surface is polished by any of the usual processes.

The herein described product, suitably illuminated and seen from the top face of sheet 3, gives the impression of a constellated-surface set with diamonds and gems.

When it is found desirable to obtain the impression imparted by mounted or set gems, a line 5 or gilt or silvered dots is painted or drawn around each design (bottom corner of Fig. 2).

The product thus obtained is inexpensive, as its preparation is most simple and rapid. From the point of view of appearance, it competes easily with the various known processes of inlaying, which are very long to manufacture and thereby extremely costly. It may be prepared in large slabs, easily cut up. Its application are innumerable: jewelry, millinery, Paris articles, inlaid fancy articles, trades; etc.

Figure 4:
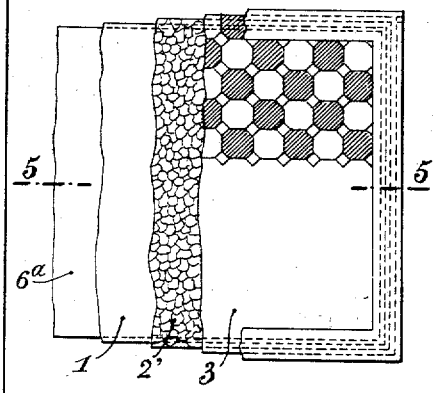
Fig. 4 is a horizontal view in fragmentary, section of an object, for example the lid of a box, decorated in accordance with this invention.
Figure 5:
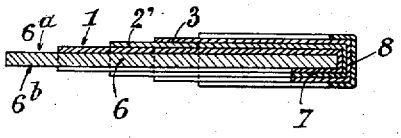
Fig. 5 is a section on line 5—5 of Fig. 4.

In Figs. 4 and 5 is shown an application of the product according to the invention, to the coating of any kind of articles.

According to this construction, an article 6 is covered with a sheet 1 of plastic or semi-plastic matter. On said sheet is placed a sheet 2′ of metal (tin for instance) suitably creased in order to show a large number of reflecting facets. Over this sheet is placed a second sheet 3 of transparent plastic matter, previously painted as in the foregoing example, preferably over its surface which is in contact with the metallic sheet 2′. The combination of the three sheets 1, 2′ and 3 is set along its edges, in any known manner, on to the part or article 6; the surface 6*a* thereof which is to be coated may be plane, curved or even polyhedral. Edges 7, as shown, may be folded under bottom face 6*b* of article 6 which may be, for instance, the lid of a box. Securing of folded edge 7 is performed in any suitable manner, for instance by means of a U-shaped iron fitting 8.

The result thus obtained conveys an impression similar to that of the slab shown in Figs. 2 and 3.

Obviously, this invention is in no way restricted to the constructions illustrated and described, which are only shown by way of example.

I claim:

1. A decorative product comprising two laminæ of plastic material and an intermediate layer of scintillating material pressed and firmly held between the laminæ and having small bright facets, a surface of the upper lamina being provided with designs, the layer of intermediate material being embedded in the plastic material and the upper lamina being transparent.

2. A product as claimed in claim 1, wherein the design on the surface of the upper layer consists of a tracing simulating precious gems following a predetermined outline of a cut gem.

3. A product as claimed in claim 1, wherein the design on the surface of the upper layer is printed and portions are colored differently to represent differently colored stones.

4. A product as claimed in claim 1, wherein the intermediate material is formed of small particles of light reflecting material capable of breaking up a light ray into numerous smaller rays and in which the design is printed on one of the laminæ.

5. A decorative product as claimed in claim 1 wherein the intermediate material includes a light reflecting powder.

6. A decorative product as claimed in claim 1, wherein each design representing a precious stone is surrounded by a line representing the setting of the stone.

7. An article of manufacture constituting an artificial gem studded body for use as jewelry and the like, and comprising a sheet of plastic material, faceted material incorporated in said sheet disposed in spaced relation to its upper surface, said sheet also provided with means forming outlines of preformed designs superposed over said material, said sheet of plastic material being transparent from its upper side down to said material and portions of said layer exposed through the outline designs and coacting therewith to present to view a simulation of the designs as if constellated with sparkling gems.

8. An article of manufacture constituting a decorative article comprising a slab of slightly pliable, tenacious and transparent material containing a substance comprising a very large number of very small facets capable of dispersing light with a multitude of small rays and means superposed above said substance providing a screen for intercepting part of the dispersed light while permitting other parts of the dispersed light to pass from the slab and thus cause parts of the substance to become visible as a sparkling surface.

9. A piece of jewelry provided on one side with a decorative product for giving to said side the impression of a surface constellated with gems, including a slab of plastic material, a substance comprising a very large number of very small bright facets embedded in the material and disposed in spaced relation to one surface of the slab, means formed of a colored transparent material, disposed between said substance on said surface forming outline designs of gems, and the portion of said slab between said surface and faceted substance being transparent.

10. A unitary slab comprising in superposed order, a layer comprising particles of faceted material, a layer of transparent material and a layer provided with outline designs formed of a colored transparent material through which the faceted material is visible and which outline designs present the faceted material in designs such as are usually employed in cutting diamonds and other stones.

11. An article comprising particles of a faceted material, means superposed over the material and forming a design through which said particles are visible and a layer of transparent celluloid providing a vehicle for the particles.

12. An article of manufacture comprising a sheet of plastic material, faceted material incorporated in said sheet and disposed in spaced relation to its upper surface, said sheet also provided with means forming outlining preformed designs superposed over said material, said sheet of plastic material being transparent from its upper side down to said material and portions of said layer exposed through the outline designs and coacting therewith to present to view a simulation of the designs as if constellated with sparkling gems.

13. In the art of forming celluloid articles, the method which consists in assembling on a sheet of celluloid a particle of material capable of breaking up light rays, disposing above the particle a design having the outline of a gem and through which the particle is visible, said particle and design coacting to simulate a gem, and subjecting the sheet to pressure and a heat condition sufficient to cause the particle to become embedded in the celluloid sheet and thus form a unitary celluloid slab having the appearance of a gem in a mounting, and polishing the surface through which the simulated gem is visible.

14. In the art of forming celluloid articles, the method which consists in assembling on a sheet of celluloid a particle of material capable of breaking up light rays, disposing above the particle a design having the outline of a gem and through which the particle is visible, said particle and design coacting to simulate a gem, and subjecting the sheet to pressure and a heat condition sufficient to cause the particle to become embedded in the celluloid sheet and thus form a unitary celluloid slab having the appearance of a gem in a mounting.

15. In the art of forming a decorative product, the method which consists in positioning on a layer of material plastic at a temperature slightly above room temperature, a layer of a substance comprising small facets spreading the layer of faceted material uniformally over the layer of plastic material, superposing on said substance a layer of transparent plastic material having thereon a design showing the outlines of gems and subjecting the layers to a heat condition at a temperature sufficient to cause the plastic material to become slightly more plastic and under pressure sufficient to cause the layers to adhere and to cause the faceted substance to become embedded in the layers of plastic material and thus form a unitary slab.

16. In the art of forming a decorative product, the method which consists in positioning on a layer of material plastic at a temperature slightly above atmospheric temperature, a layer of a substance comprising small facets spreading the layer of faceted material uniformly over the layer of plastic material, superposing on said substance a layer of transparent plastic material having thereon a design showing the outlines of gems and subjecting the layers to pressure and heat sufficient to cause the layers to adhere and to cause the faceted substance to become embedded in the layers of plastic material and thus form a unitary slab.

17. In the art of forming a decorative sheet, the method which consists in spreading a layer of ground glass on a surface of a layer of celluloid, superposing on said ground glass layer a sheet of transparent celluloid having printed on the side engaging the glass a plurality of designs and subjecting the layers to heat and pressure to cause them to adhere with the glass layer therebetween.

18. A decorative product comprising a base sheet, a layer of ground glass particles covering said base sheet and a sheet of transparent celluloid having printed thereon a design through which the ground glass is visible as a sparkling surface.

MAURICE MOISE ASSAEL.